(12) United States Patent
Freienstein et al.

(10) Patent No.: US 10,093,261 B2
(45) Date of Patent: Oct. 9, 2018

(54) METHOD FOR ACTIVATING A SAFETY ACTUATOR OF A MOTOR VEHICLE

(75) Inventors: Heiko Freienstein, Weil der Stadt (DE); Marcel Maur, Asperg (DE)

(73) Assignee: ROBERT BOSCH GmbH, Stuttgart (DE)

( * ) Notice: Subject to any disclaimer, the term of this patent is extended or adjusted under 35 U.S.C. 154(b) by 71 days.

(21) Appl. No.: 14/342,498

(22) PCT Filed: Aug. 28, 2012

(86) PCT No.: PCT/EP2012/066663
§ 371 (c)(1),
(2), (4) Date: Jun. 27, 2014

(87) PCT Pub. No.: WO2013/030179
PCT Pub. Date: Mar. 7, 2013

(65) Prior Publication Data
US 2014/0336880 A1    Nov. 13, 2014

(30) Foreign Application Priority Data
Sep. 2, 2011   (DE) .................. 10 2011 082 067

(51) Int. Cl.
*B60R 21/0132*    (2006.01)
*B60R 21/0134*    (2006.01)
*B60R 22/48*    (2006.01)

(52) U.S. Cl.
CPC ...... *B60R 21/0132* (2013.01); *B60R 21/0134* (2013.01); *B60R 22/48* (2013.01); *B60R 2022/4808* (2013.01)

(58) Field of Classification Search
CPC ........ B60R 2022/4808; B60R 21/0132; B60R 21/0134; B60R 22/48
See application file for complete search history.

(56) References Cited

U.S. PATENT DOCUMENTS

| 2003/0114973 A1* | 6/2003 | Takagi | ............... B60R 21/0132 |
| | | | 701/45 |
| 2004/0195030 A1* | 10/2004 | Eberle | .................. B60R 21/013 |
| | | | 180/271 |
| 2006/0253240 A1* | 11/2006 | Rao | ..................... B60W 50/035 |
| | | | 701/48 |

FOREIGN PATENT DOCUMENTS

| CN | 1784327 A | 6/2006 |
| DE | 10121386 | 8/2002 |
| DE | 10320828 | 12/2004 |

(Continued)

OTHER PUBLICATIONS

International Search Report for PCT/EP2012/066663, dated Nov. 28, 2012.

(Continued)

*Primary Examiner* — Charles J Han
(74) *Attorney, Agent, or Firm* — Norton Rose Fulbright US LLP; Gerard Messina

(57) ABSTRACT

A method for activating a safety actuator of a motor vehicle, including: ascertaining an endangerment model of the motor vehicle with the aid of an anticipatory sensor system and at least one characteristic value of a driving operation of the motor vehicle; ascertaining a controllability of the motor vehicle by a driver of the motor vehicle with the aid of the at least one characteristic value; and activating the safety actuator to an extent which is a function of the endangerment model and the controllability.

15 Claims, 3 Drawing Sheets

(56) References Cited

FOREIGN PATENT DOCUMENTS

DE  102005038226        2/2007
DE  102005038226 A1 *  2/2007  ........... B60R 21/013
WO  WO2004/103779      12/2004
WO  2005108173 A1      11/2005

OTHER PUBLICATIONS

VDA Technischer Kongress 2010, Baumann et al.," " Pre-Safe Pulse, die Erweiterung des Insassenschutzes durch Nutzung der Vorunfallphase.

* cited by examiner

METHOD FOR ACTIVATING A SAFETY ACTUATOR OF A MOTOR VEHICLE

FIELD OF THE INVENTION

The present invention relates to a method for activating a safety actuator of a motor vehicle.

BACKGROUND INFORMATION

In the field of safety technology of motor vehicles, it is known that a strength of intervention by a safety system may be determined by taking into account an endangerment of occupants, a driving situation, and an instantaneous position of the vehicle seat.

For example, PCT Published Patent Appln. No. WO 2004/103779 A1 discloses an occupant protection system of a motor vehicle which transfers a vehicle seat into an impact-optimized position by quickly adjusting the seat of the motor vehicle.

A pre-triggering, propulsive system is furthermore known from "12. VDA Technischer Kongress 2010, Baumann et al.," "PRE-SAFE Pulse, die Erweiterung des Insassenschutzes durch Nutzung der Vorunfallphase," this system accelerating an occupant of the motor vehicle in advance in the case of a front impact of a vehicle during a pre-impact phase with the aid of an air bag or a seat belt in such a way that a speed due to an impact pulse and a speed of the pre-acceleration superimpose in a destructive manner.

Electromotive seat belt tensioners are known in motor vehicles, in particular of the upper classes. Furthermore, an anticipatory sensor system, e.g., a radar system for adaptive cruise control, is known in such motor vehicles as well as a braking action initiated automatically with the aid of an automatic braking device.

SUMMARY

It is an object of the present invention to provide an improved method for activating a safety actuator of a motor vehicle.

The object is achieved with the aid of a method for activating a safety actuator of a motor vehicle, including:
  ascertaining an endangerment model of the motor vehicle with the aid of an anticipatory sensor system and at least one characteristic value of a driving operation of the motor vehicle;
  ascertaining a controllability of the motor vehicle by a driver of the motor vehicle with the aid of the at least one characteristic value; and
  activating the safety actuator to an extent which is a function of the endangerment model and the controllability.

With the aid of the method according to the present invention, a degree of an intervention of the safety actuator is advantageously adjusted to the driver of the motor vehicle as a function of a controllability of the motor vehicle by the driver. In this way, the driver is able to influence the operating elements of the motor vehicle and thus the driving behavior of the motor vehicle to the greatest extent possible, so that a possibly disproportionate intervention by the safety actuator into the driving operation does not take place or is considerably reduced. In this way, an optimized combination of the ascertained endangerment model and the ascertained controllability is used for a degree of control or activation of the safety actuator of the motor vehicle.

One preferred specific embodiment of the method provides that the at least one characteristic value of the driving operation of the motor vehicle is a speed of the motor vehicle. Due to the physical fact that the speed of the motor vehicle essentially influences a controllability of the vehicle by the driver, one influence variable for activating the safety actuator is thus advantageously taken into account. The degree of intervention of the safety actuator may therefore be advantageously adjusted to the particular speed situation of the vehicle in a very efficient manner.

One advantageous refinement of the method according to the present invention provides that the at least one characteristic value of the driving operation of the motor vehicle is a float angle of the motor vehicle. Similarly to the speed of the motor vehicle, the float angle also represents a parameter of a controllability of the motor vehicle. By taking into account the float angle, the degree of intervention by the safety actuator is thus advantageously co-determined in a decisive manner.

One advantageous refinement of the method provides that a vehicle-seat based restraint arrangement is adjusted when the safety actuator is activated. Vehicle-seat based restraint arrangement represents a noticeable portion of the protection potential by the safety actuator in the motor vehicle, so that by adjusting them according to the present invention, the driver's influence on the motor vehicle is potentially considerably increased.

It is preferably provided that at least one plane of a motor vehicle seat is adjusted. In this way, a position of the driver of the motor vehicle in the vehicle seat may be advantageously changed in such a way that the driver is transferred into an optimized position from the safety-critical viewpoint during a pre-impact phase.

One advantageous refinement of the method according to the present invention provides that the adjustment of the vehicle-seat based restraint arrangement is carried out in interaction with the adjustment of a seat belt tensioner device of the motor vehicle. This makes it possible for the driver to be provided with an optimized influence on the motor vehicle, by taking into account the optimized safety aspects.

One advantageous refinement of the method according to the present invention provides that a degree of an adjustment path and/or an adjustment speed of the seat is/are implemented as a function of the endangerment model and of the controllability of the motor vehicle. It is thus advantageously achieved that an intervention by the safety actuator is advantageously optimized for the driver or an intervention of the driver is optimized for the motor vehicle.

One advantageous specific embodiment of the method according to the present invention provides that the anticipatory sensor system is used to ascertain a preliminary phase of a front, and/or a side and/or a rear impact of the motor vehicle. In this way, the endangerment model of the motor vehicle is advantageously determined for preliminary phases of different accident scenarios, so that the intervention by the safety actuator is adjusted to the accident characteristic in an optimized manner.

One advantageous refinement of the method provides that the endangerment model is designed as a product of an impact probability by an impact severity of the motor vehicle ascertained in advance. In this way, the endangerment model of the motor vehicle is ascertained in advance depending on the driving situation in an optimized manner, so that the triggering degree of the safety actuator is carried out in an optimized manner.

One advantageous refinement of the method provides that the method is implemented with the aid of an algorithm. This provides an easily applicable, easily adaptable way to carry out the method according to the present invention.

One advantageous refinement of the method provides that a look-up table or an interpolation is used for switching between the supporting points of the algorithm. This makes it advantageously possible to switch between the supporting points of the algorithm in a simple manner, whereby an operative behavior of the algorithm may be easily adapted as desired.

The other features and advantages of the present invention are elucidated in detail below based on three figures. The figures are used in particular to illustrate the principles which are essential to the present invention and are not conceived for the purpose of providing constructive details or concrete details of method steps.

DETAILED DESCRIPTION

Figure 1:
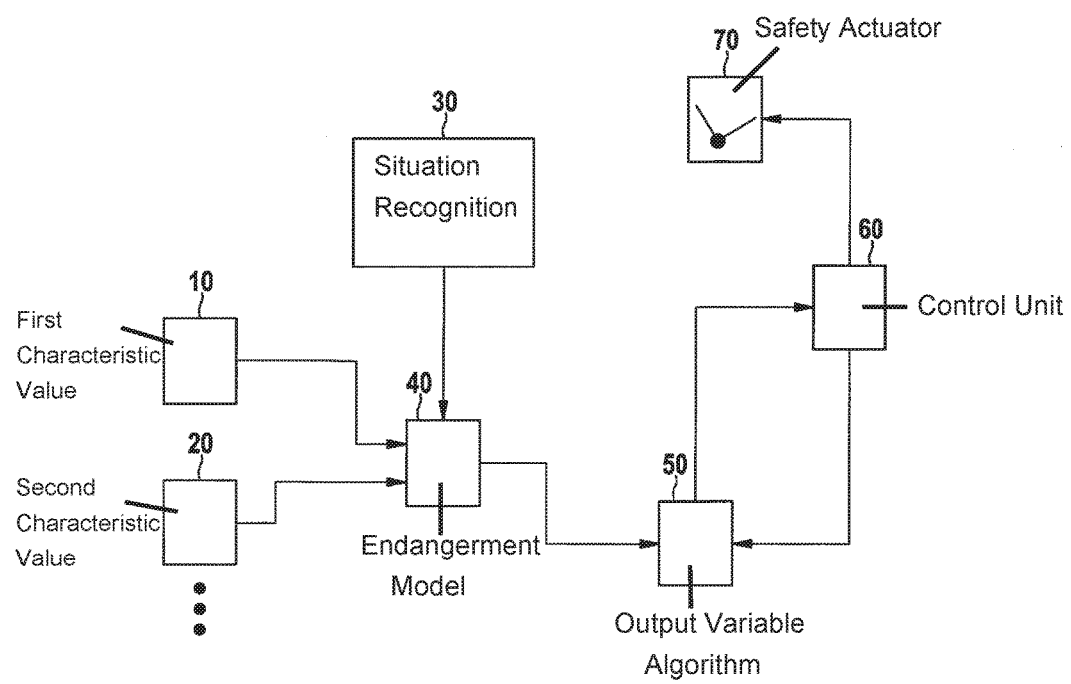
FIG. 1 shows a block diagram of a conventional method for activating a safety actuator of a motor vehicle.

FIG. 1 highly schematically shows a block diagram of a method for activating the safety actuator of a motor vehicle according to the related art. Here, an endangerment model 40 of the motor vehicle is ascertained with the aid of a situation recognition 30 having an anticipatory sensor system of the motor vehicle (e.g., radar adaptive cruise control, camera in the bumper, etc.), as well as with the aid of a first characteristic value 10 of a driving operation (e.g., an actual speed of the vehicle) and with the aid of a second characteristic value 20 of a driving operation (e.g., a float angle of the motor vehicle, i.e., a difference between a desired angle and an actual angle of the steering wheels). A degree of an endangerment of the motor vehicle which is ascertained with the aid of the anticipatory sensor system may, for example, be ascertained from a product of an impact probability determined with the aid of the sensor system by an impact severity of the motor vehicle determined in advance with the aid of the sensor system. Alternatively or additionally to first characteristic value 10 and second characteristic value 20, other characteristic values of a driving operation of the motor vehicle are also conceivable, which is indicated by dots in FIG. 1.

An output variable of endangerment model 40 is supplied as an input variable to an algorithm 50 which is, for example, designed as an adjustment algorithm for a control unit 60 (e.g., an electronic vehicle seat control unit) of the motor vehicle. An output variable of algorithm 50 effects control unit 60 as an input variable by algorithm 50 predefining a setpoint value for control unit 60. Control unit 60 is coupled back to algorithm 50 through a transmission of an actual value to algorithm 50.

Control unit 60 activates a safety actuator 70 of the motor vehicle. Safety actuator 70 may, for example, be designed as a vehicle-seat based restraint arrangement. The vehicle-seat based restraint arrangement includes in the simplest case an adjustment of the seat adjustment planes, a seat height adjustment, a horizontal seat adjustment, an adjustment of the seating area inclination or seat back inclination, or also an adjustment of a headrest or a seat contour (e.g., through side bolsters) being provided. In more complex systems, the adjustment of the vehicle-seat based restraint arrangement may be carried out in an interaction with a seat belt tensioner device of the motor vehicle (e.g., for removing seat belt slacks). A diversified seat adjustment of the motor vehicle is carried out in the described manner based on concrete endangerment situations of the motor vehicle.

Figure 2:
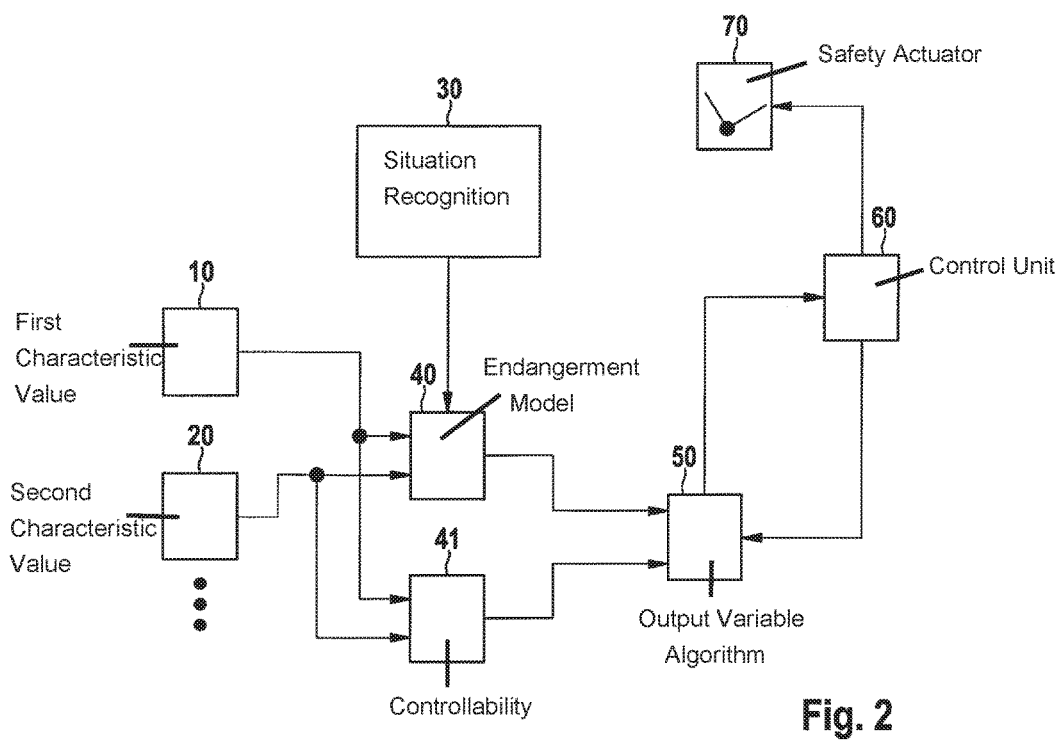
FIG. 2 shows a block diagram of one specific embodiment of the method according to the present invention for activating a safety actuator of a motor vehicle.

FIG. 2 shows one specific embodiment of the method according to the present invention for activating a safety actuator of a motor vehicle. FIG. 2 corresponds to FIG. 1 with the only exception being that now a controllability 41 of the motor vehicle is also used as reference for an input variable for algorithm 50. Controllability 41 represents a degree as to what extent the motor vehicle may be controlled by the driver of the motor vehicle based on concrete driving operating parameters and is ascertained—similarly to endangerment model 40—with the aid of first characteristic value 10 and second characteristic value 20 of the driving operation of the motor vehicle. Controllability 41 is preferably estimated from vehicle dynamics data with the aid of a state observer. In this way, another input variable in the form of an output variable of controllability 41 results for algorithm 50 as the input variable, additionally to an output variable of endangerment model 40. The effect of algorithm 50 on control unit 60 or the effect of control unit 60 on safety actuator 70 corresponds to the effect of FIG. 1 and is therefore not explained again.

It is thus apparent from FIG. 2 that with the aid of the present invention, a refinement or improvement of algorithm 50 is achieved by using another input variable for algorithm 50 in the form of controllability 41. As a result of this measure, an output variable of algorithm 50 is also refined or improved by the present invention in such a way that control unit 60 is able to classify in a more diversified manner concrete situations prior to accidents and therefore implement a triggering strategy for safety actuator 70 in an improved manner. When carrying out algorithm 50, a look-up table may be used, for example, to switch between the supporting points of algorithm 50 or an interpolation may be used between the supporting points.

Figure 3:
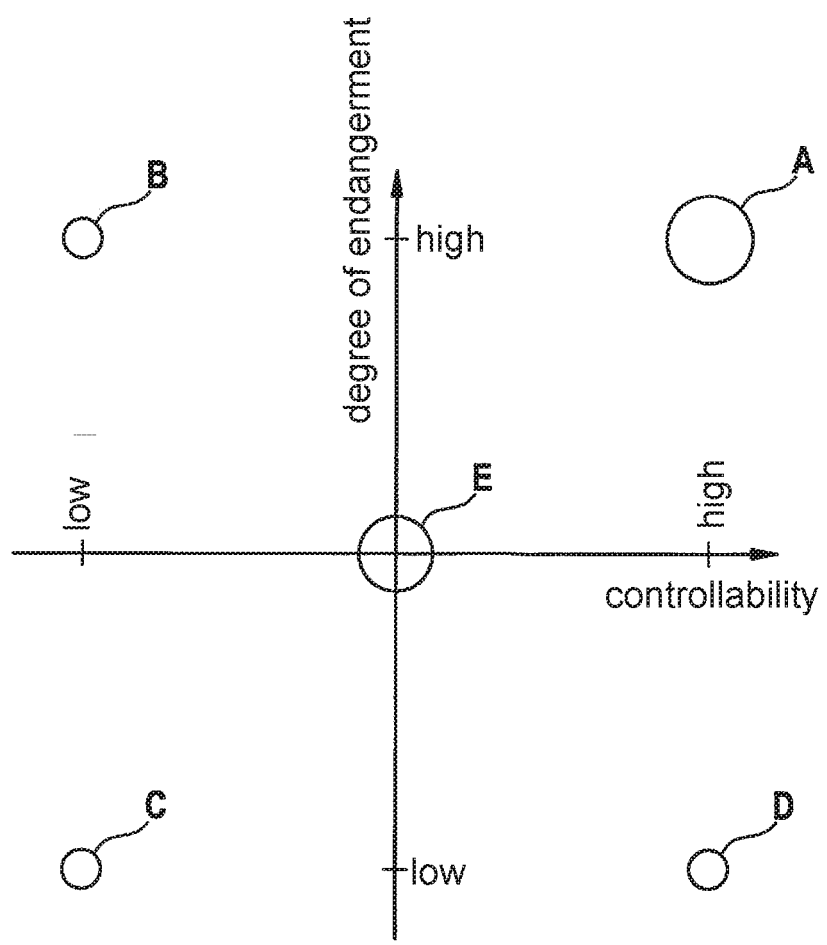
FIG. 3 shows a schematic representation of interventions according to the present invention by the safety actuator of a motor vehicle during a pre-accident phase of the motor vehicle.

Based on a schematic four-quadrant state diagram, FIG. 3 shows a schematic mode of operation of the method according to the present invention for activating a safety actuator 70 of a motor vehicle. Here, a dependence of the intervention by safety actuator 70 is illustrated by the two parameters "endangerment degree" and "controllability" using five supporting points as an example.

The x axis of the diagram scales a controllability of the motor vehicle. The y axis of the diagram scales a degree of an endangerment of the motor vehicle which is ascertained with the aid of situation recognition 30 using an anticipatory sensor system. In the first quadrant of the graph of FIG. 3, a state of a high controllability and a high endangerment degree of the motor vehicle are indicated. As a result therefrom, an intervention A by a safety actuator 70 of the motor vehicle or a supporting point A of algorithm 50 (e.g., adjustment paths/displacement speed of vehicle seats) is strongly pronounced. This is indicated graphically by a large circumference or a large circle diameter of intervention A. Intervention A, which is strong per se, may cause increased interaction between the vehicle and the driver, which in this case has no negative effect insofar as that a high degree of controllability 41 of the motor vehicle, i.e., a stable driving situation, is present at the point in time of triggering of safety actuator 70.

In the second quadrant of the diagram of FIG. 3, a state of a high endangerment and a low controllability of the motor vehicle are indicated. As a result therefrom, an intervention B by safety actuator 70 (or a supporting point B of algorithm 50) into the motor vehicle is small. This is indicated by a small circumference or a small circle diameter of intervention B.

In the third quadrant of the diagram of FIG. 3, a state of a low endangerment and a low controllability of the motor vehicle are indicated schematically. As a result therefrom, an intervention by safety actuator 70 or supporting point C of algorithm 50 is small, which is indicated by a graphic illustration (small circumference, small circle diameter) of intervention C.

In the fourth quadrant of the diagram of FIG. 3, a state of a high controllability and a low endangerment of the motor vehicle are indicated. As a result therefrom, an intervention D by safety actuator 70 of the motor vehicle or a supporting point D of algorithm 50 is small. This is indicated by a graphic illustration (small circumference, small circle diameter) of intervention D.

In a state which corresponds to a point of intersection between the x and the y axes, a medium controllability and a medium endangerment of the motor vehicle are present. In this case, an intervention E by safety actuator 70 or a supporting point E of algorithm 50 is medium-large. This is indicated by a graphic illustration (medium-large circumference, medium-large circle diameter) of intervention E.

It is thus advantageously possible with the aid of the method according to the present invention to proportionally adjust the degree of the intervention by safety actuator 70 of the motor vehicle as a function of an endangerment model and a controllability of the vehicle. In this way, a driver of the motor vehicle is advantageously not irritated too strongly during the driving operation so that a dangerous driving situation may still be corrected by a manual influence of the driver (e.g., by a strong steering intervention or an actuation of the brake pedal of the motor vehicle, etc.) depending on the circumstances. An intervention by the safety actuator adapted to the situation provides the driver with an opportunity to still evade dangerous accident situations by personal intervention (e.g., steering, braking).

A travel of the motor vehicle at a maximum speed $v_{max}$ provides an example to illustrate the mode of operation of the method according to the present invention. In such a case, a strongly limited controllability by the driver results and according to the present invention, the ability of the safety actuator to adjust the seat is, for example, reduced or completely suppressed in its strength.

The intention is naturally to control, trigger, or activate any type of safety actuator 70 with the aid of the method according to the present invention. The above-described adjustment of a vehicle-seat based restraint arrangement is therefore to be considered to be only one of many possible examples of safety actuator 70 and may be supplemented or replaced by any existing safety actuator 70 or by a safety actuator yet to be developed in the future.

It is apparent from FIG. 3 that comparably small interventions by safety actuator 70 result in the case of a low controllability 41 of the motor vehicle, the interventions possibly even being completely suppressed under certain circumstances. In the case of a high controllability 41 of the motor vehicle, a degree of the intervention by safety actuator 70 is accordingly strongly dependent on the endangerment of the motor vehicle. In the case of a high endangerment, a very strong intervention (intervention A) may be carried out which may even go as far as to a pre-accelerating system.

In the case of the vehicle-seat based restraint arrangement, an increasing intervention degree of safety actuator 70 may mean an increase in the adjustment paths or an enlargement of the adjustment speed of the vehicle seat—coupled with an electromotive action of the seat belt tensioner device under certain circumstances. Furthermore, the intervention degree may be implemented as a function of an instantaneous seating position of the driver and an adjustment device of the vehicle-seat based restraint arrangement.

To sum up, the present invention provides a method for activating a safety actuator of a motor vehicle which activates and utilizes present and adapted safety systems or actuators in the motor vehicle in an optimized manner. For triggering the safety actuator, the present invention uses, in particular, any type of information which defines the ability of a driver to control the motor vehicle at the point in time of triggering the safety actuator.

In this way, it is advantageously possible to mitigate negative effects of erroneous classifications of the safety systems. It is advantageously possible with the aid of the present invention to implement the operative behavior of safety actuator 70 in such a way that the driver largely influences the motor vehicle after weighing safety aspects. In this way, the possibility of the driver losing control of the motor vehicle, triggered by pulling away the steerer from the steering wheel, for example,—an event that is no longer reversible under certain circumstances—is advantageously avoided or its probability is very strongly reduced.

It is obvious to those skilled in the art that features of the present invention may be adapted and combined in a suitable manner, without departing from the core of the present invention. In particular, the system according to the present invention is suitable for any type of safety actuator of the motor vehicle, e.g., also for a safety actuator for influencing a steering and/or a braking and/or a speed behavior of the motor vehicle.

What is claimed is:

1. A method for activating a safety actuator of a motor vehicle, comprising:
    ascertaining an endangerment model of the motor vehicle with the aid of an anticipatory sensor system and at least one characteristic value of a driving operation of the motor vehicle;
    ascertaining a controllability of the motor vehicle by a driver of the motor vehicle with the aid of the at least one characteristic value, wherein the controllability represents a degree to which the driver is able to control the motor vehicle; and
    activating the safety actuator to an extent which is a function of the endangerment model and the controllability, wherein:
        the activating is based on a value associated with an intervention point located in a quadrant of a four-quadrant state diagram in which a first coordinate of the intervention point represents the controllability and a second coordinate of the intervention point represents a degree of endangerment as determined by the endangerment model,
        a first quadrant of the state diagram represents high controllability and high endangerment,
        a second quadrant of the state diagram represents low controllability and high endangerment,
        a third quadrant of the state diagram represents low controllability and low endangerment, and a fourth quadrant of the state diagram represents high controllability and low endangerment.

2. The method as recited in claim 1, wherein the at least one characteristic value is a speed of the motor vehicle.

3. The method as recited in claim 1, wherein the at least one characteristic value is a float angle of the motor vehicle.

4. The method as recited in claim 1, further comprising adjusting a vehicle-seat based restraint arrangement when the safety actuator is activated.

5. The method as recited in claim 4, wherein at least one plane of a motor vehicle seat is adjusted.

6. The method as recited in claim 4, wherein the adjustment of the vehicle-seat based restraint arrangement is carried out in interaction with an adjustment of a seat belt tensioner device of the motor vehicle.

7. The method as recited in claim 4, wherein a degree of at least one of an adjustment path and an adjustment speed of the vehicle-seat based restraint arrangement is implemented as a function of the endangerment model and of the controllability of the motor vehicle.

8. The method as recited in claim 1, further comprising operating an anticipatory sensor system to ascertain a preliminary phase of at least one of a front impact, a side impact, and a rear impact of the motor vehicle.

9. The method as recited in claim 1, wherein the endangerment model is formed as a product of an impact probability by an impact severity of the motor vehicle ascertained in advance.

10. The method as recited in claim 1, wherein the method is implemented with the aid of an algorithm.

11. The method as recited in claim 10, wherein one of a look-up table and an interpolation is used to switch between supporting points of the algorithm.

12. The method as recited in claim 1, further comprising controlling the safety actuator to a degree which depends on a combination of the endangerment model and the controllability of the motor vehicle.

13. A device having a software program for carrying out a method for activating a safety actuator of a motor vehicle, comprising:
ascertaining an endangerment model of the motor vehicle with the aid of an anticipatory sensor system and at least one characteristic value of a driving operation of the motor vehicle;
ascertaining a controllability of the motor vehicle by a driver of the motor vehicle with the aid of the at least one characteristic value, wherein the controllability represents a degree to which the driver is able to control the motor vehicle; and
activating the safety actuator to an extent which is a function of the endangerment model and the controllability, wherein:
the activating is based on a value associated with an intervention point located in a quadrant of a four-quadrant state diagram in which a first coordinate of the intervention point represents the controllability and a second coordinate of the intervention point represents a degree of endangerment as determined by the endangerment model,
a first quadrant of the state diagram represents high controllability and high endangerment,
a second quadrant of the state diagram represents low controllability and high endangerment,
a third quadrant of the state diagram represents low controllability and low endangerment, and
a fourth quadrant of the state diagram represents high controllability and low endangerment.

14. The device as recited in claim 13, wherein the device is a control unit of the motor vehicle.

15. The device as recited in claim 13, wherein the control of the safety actuator is performed to a degree which depends on a combination of the endangerment model and the controllability of the motor vehicle.

* * * * *